(12) United States Patent
Park

(10) Patent No.: US 6,749,513 B2
(45) Date of Patent: Jun. 15, 2004

(54) METHOD OF THE GAME FOR ONE TO MANY PERSONS ON THE ONLINE

(76) Inventor: Jong-hyouk Park, A-201, 150-5 Samsung 1-dong, Seoul (KR), 135-878

( * ) Notice: Subject to any disclaimer, the term of this patent is extended or adjusted under 35 U.S.C. 154(b) by 0 days.

(21) Appl. No.: 10/204,878
(22) PCT Filed: Feb. 2, 2001
(86) PCT No.: PCT/KR01/00149
§ 371 (c)(1), (2), (4) Date: Nov. 19, 2002
(87) PCT Pub. No.: WO01/63541
PCT Pub. Date: Aug. 30, 2001

(65) Prior Publication Data
US 2003/0144058 A1 Jul. 31, 2003

(51) Int. Cl.$^7$ .................................................. A63F 9/24
(52) U.S. Cl. ...................................................... 463/42
(58) Field of Search .............................. 463/9, 14, 30, 463/31, 37, 40–42; 273/236, 260, 460

(56) References Cited
U.S. PATENT DOCUMENTS

| | | | |
|---|---|---|---|
| 5,779,549 A | * | 7/1998 | Walker et al. ................. 463/42 |
| 5,956,485 A | * | 9/1999 | Perlman ....................... 709/204 |
| 6,024,643 A | | 2/2000 | Begis |
| 6,026,079 A | | 2/2000 | Perlman |
| 6,042,477 A | | 3/2000 | Addink |
| 2002/0072412 A1 | * | 6/2002 | Young et al. ................. 463/42 |

FOREIGN PATENT DOCUMENTS

JP 10-097575 4/1998

* cited by examiner

Primary Examiner—Kim Nguyen
(74) Attorney, Agent, or Firm—Senniger, Powers, Leavitt & Roedel

(57) ABSTRACT

The present invention relates to a game method for allowing simultaneously playing a game of paduck, chess, Korean chess, etc. through the one-line internet in a one-to-many manner. The game method comprises the steps of: connecting by the members with the web site via the internet network, inspecting the member information including their match records and alist of matches, in which the members can participate, provided by the web site, selecting a match, in which the members want to participate, of the list of matches, and connecting with a pertinent match server; when the selected match starts, providing by the match server the members and the professional with the match screen; when the members select and input moves, extracting by the program portion a highest-ranking move which greatest majority of the members select, and searching moves which are selected by the members in a ratio almost equal to that of the highest-ranking move; applying by the match server the highest-ranking move to the match screens of the members and the professional; and when the professional selects a move, applying by the match server the move selected by the professional to the match screens of the members and the professional.

4 Claims, 5 Drawing Sheets

METHOD OF THE GAME FOR ONE TO MANY PERSONS ON THE ONLINE

FIELD OF THE INVENTION

The present invention relates to a game method for allowing simultaneous playing of a game of paduk, chess, Korean chess, etc. through the on-line internet in a one-to-many manner, and more particularly, to a game method for allowing a specific person to simultaneously play games with many users divided into various groups.

BACKGROUND OF THE INVENTION

Recently, users of the internet have increased owing to the rapid spread of the internet, and accordingly, various network games using the internet have been developed and attempts to apply the network to existing games have been continuously made. Among the attempts, competition games, such as paduk, Korean chess, chess, etc., in which a person competes with another person for victory in a one-on-one manner, have been serviced through a lot of web sites. Further, the existing web sites attract members thereto by offering premiums or other services to the members through an additional service, such as the accumulation of points according to victory or defeat of the members, etc.

However, the conventional attempts have been limited to the one-on-one competition, and thus, only two competitors, who act in concert with each other, can compete with each other. Consequently, it is substantially impossible for novices to have a match with professionals. In order to solve the problem, web sites offering a service which provide novice members with a match with a professional have been opened. However, the service has been limited in providing to novice members opportunities of playing a match with a professional since there is not a high probability that one member among a lot of members will have a match with a professional.

SUMMARY OF THE INVENTION

Therefore, the object of the present invention conceived to solve the above problem is to provide a service by which a specific person can simultaneously play a competition game with many persons in a one-to-many manner, and in which among a plurality of moves selected by the respective persons, the move selected by the largest number of persons is determined as a final move. In addition, another object of the present invention is to provide a service wherein when a plurality of selection ratios of moves are collected in the process of a one-to-many match, the match is divided into a plurality of matches if there are moves selected in almost equal ratios, and the multiple matches proceed simultaneously.

In order to achieve the above object of the invention, the present invention provides a game method for allowing simultaneously playing a game through the online internet in a one-to-many manner, using a system including a main server 100 which controls respective apparatuses, processes data and connects members and a professional as a specific person with a pertinent match server in accordance with the progress of the game; a program portion 101 for processing the progress of a match in the one-to-many manner; a first match server 102 for controlling an original first match between the professional and the members and for providing the professional and the members with a screen of and information on the match; a second match server 103 which, when the match is divided, separately controls a match divided from the match and provides the professional and members divided from the first match server with a screen of and information on the divided match; a third match server 104 for controlling a match divided from the first or second match server; a temporary database 105 for storing data, which can be changed at any time, such as the state of division of the match, information on the match with which members are affiliated, etc.; and a database 106 for storing information on the members and on a competition game web site. The game method comprises the steps of: connecting by the members with the web site via the internet network, inspecting the member information including their match records and a list of matches, in which the members can participate, provided by the web site, selecting a match, in which the members want to participate, of the list of matches, and connecting with a pertinent match server; when the selected match starts, providing by the match server the members and the professional with the match screen; when the members select and input moves, extracting by the program portion a highest-ranking move which greatest majority of the members select, and searching moves which are selected by the members in a ratio almost equal to that of the highest-ranking move; applying by the match server the highest-ranking move to the match screens of the members and the professional; and when the professional selects a move, applying by the match server the move selected by the professional to the match screens of the members and the professional.

Moreover, the step of searching moves which are selected by the members in a ratio almost equal to that of the highest-ranking move may further includes the step of, if there is a second highest-ranking move selected in a ratio almost equal to that of the highest-ranking move, connecting by the main server members who select the second highest-raking move and the professional with a second match server and informing the members and the professional connected with the second match server that the match has been divided. The members may connect with the match server with which the members themselves are affiliated, and the professional connects simultaneously with the respective match servers. The step of applying by the match server the highest-ranking move to the match screens of the members and the professional may further includes the step of applying by the match server the highest-ranking move to a few members who select minor moves.

DETAILED DESCRIPTION OF THE PREFERRED EMBODIMENTS

Hereinafter, a preferred embodiment of the present invention will be explained in detail with reference to the drawings.

Figure 1:
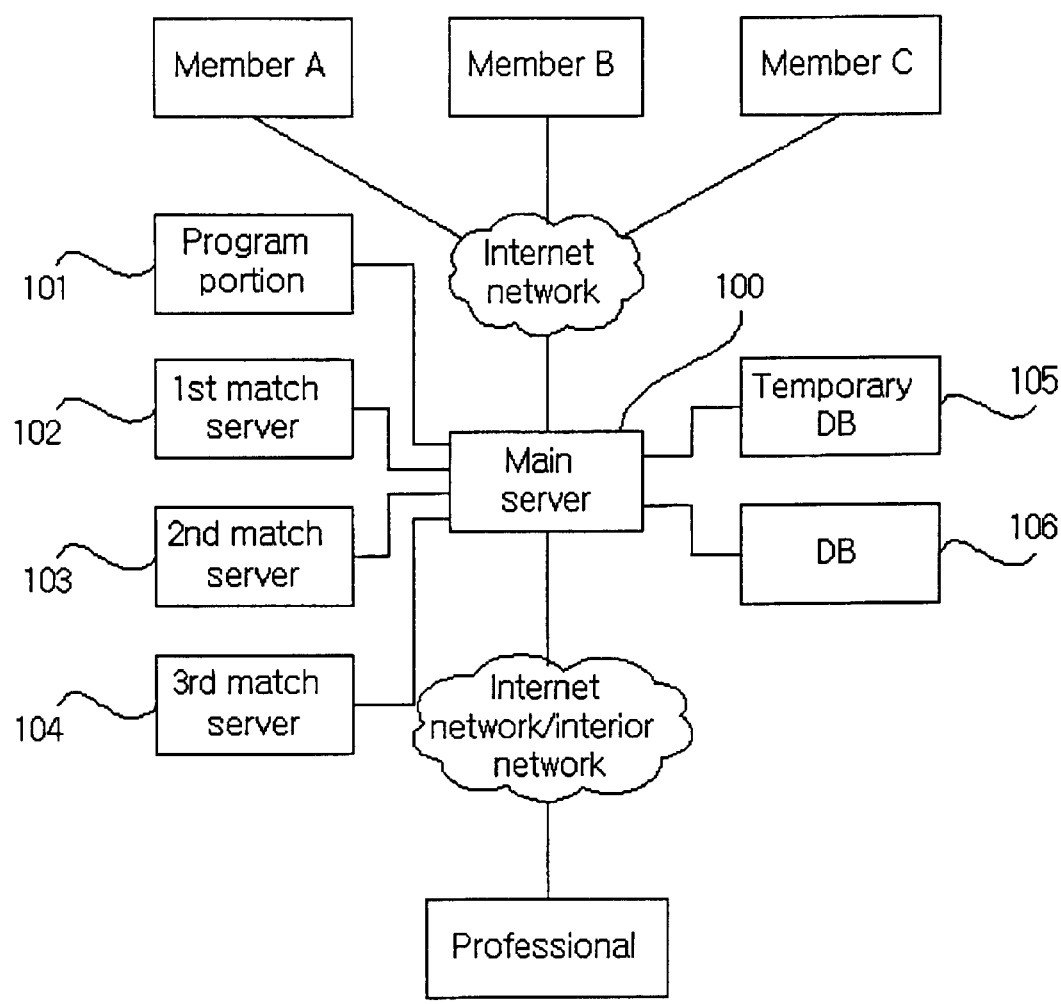
FIG. 1 is a constitutional view of a network according to the present invention.

FIG. 1 exemplifies an embodiment of the constitution of a network according to the present invention.

Members of a web site providing a competition game service, and a professional as a specific person connect, via the internet network, with a main server 100 which controls respective apparatuses, processes data and connects the members and the professional with a pertinent match server in accordance with the progress of the game of the present invention. The main server 100 connects with a program portion 101 for processing the progress of a one-to-many manner match. It connects with a first match server 102 for controlling an original first match between the professional and the members connected by the main server and for providing the professional and the members with a screen of and information on the match. It also connects with a second match server 103 which, when the match progressing in the first match server is divided, separately controls a match divided from the original match and provides the professional and members divided from the first match server with a screen of and information on the divided match. It further connects with a third match server 104 for performing the same function as the second match server, and for controlling a match divided from the first or second match server. It connects still further with a temporary database 105 for storing data, which can be changed at any time, such as the state of division of a match, information on a match with which members are affiliated, etc. Finally, it connects with a database 106 for storing information on a web site, such as member information, homepage information, etc.

Obviously, the number of match servers is not limited to three servers including the first, second and third match servers as described above, but can be appropriately varied with a scale of a system or match.

Figure 2:
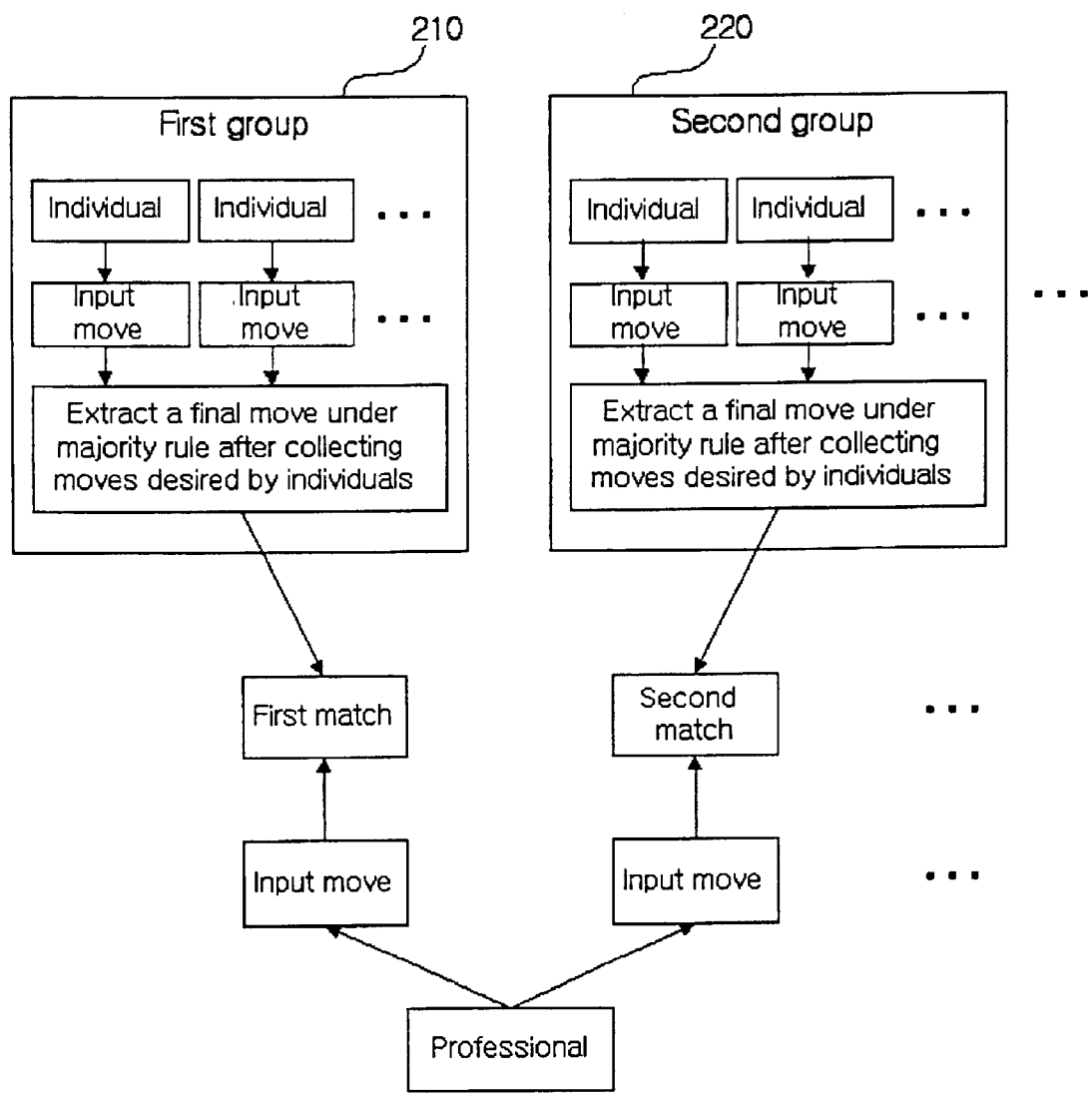
FIG. 2 shows a progressing state of a one-to-many match according to the present invention.

FIG. 2 shows a progressing state of a one-to-many manner match according to the present invention. It shows the progressing state of the match between the professional as a specific person and members divided into various groups.

That is, members affiliated with an original first group (first match server) upon start of a match, select moves where stones (chessman in case of Korean chess or chess) will be moved and then, the first match server collects and computes the moves selected by a majority of members and finally selects one move (step 210).

However, if there are two or more moves which are selected in almost equal ratios by the members in the first group (e.g., when the ratio of the numbers of the members who select two high-ranking moves is 35:32 of total 100 members), the first match server divides the match. Accordingly, the main server designates the second match server which is not in operation and transmits data on a match divided from the first match to the second match server. At the same time, the main server connects members (e.g., 32 or more members of the total 100 members) divided from the first match with the second match server and thus forms a second group (step 220). Therefore, the second match is developed from the original first match and the matches which the professional should have with the members increase in number from 1 to 2. Through such procedure, although the professional has one match when initially starting the match, a plurality of matches are derived from the original match as it progresses and thus the one professional simultaneously has multiple matches constituted by a plurality of groups of members. Consequently, the multiple matches can be simultaneously performed in a one-to-many manner.

At this time, the number of matches dividable from an original match may be limited in the web site, and a few members who select and input minor moves other than a move which a great number of members select, should accept the move under majority rule.

Figure 3A:
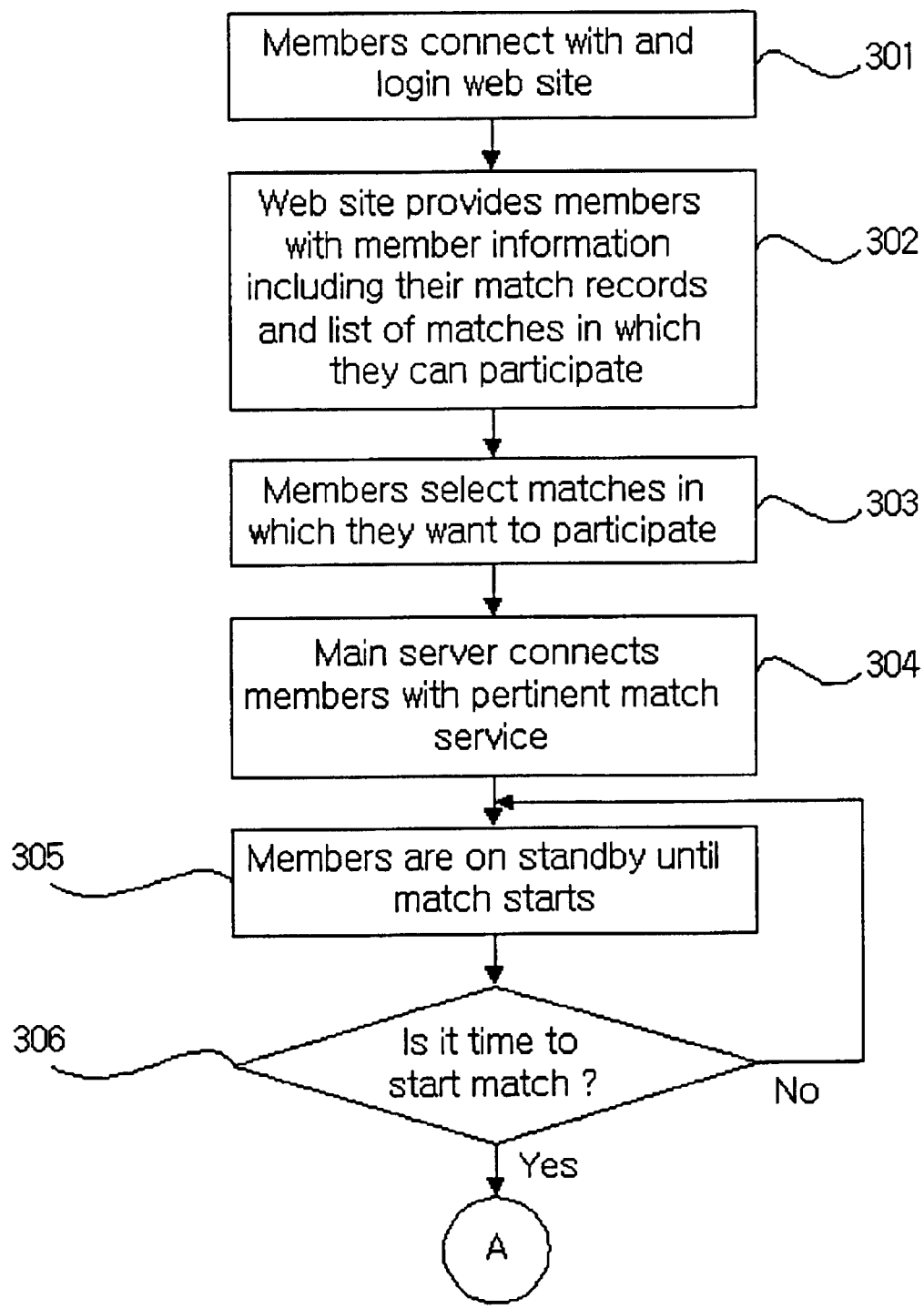
FIGS. 3*a* and 3*b* show the procedure of a one-to-many match according to the present invention.
Figure 3B:
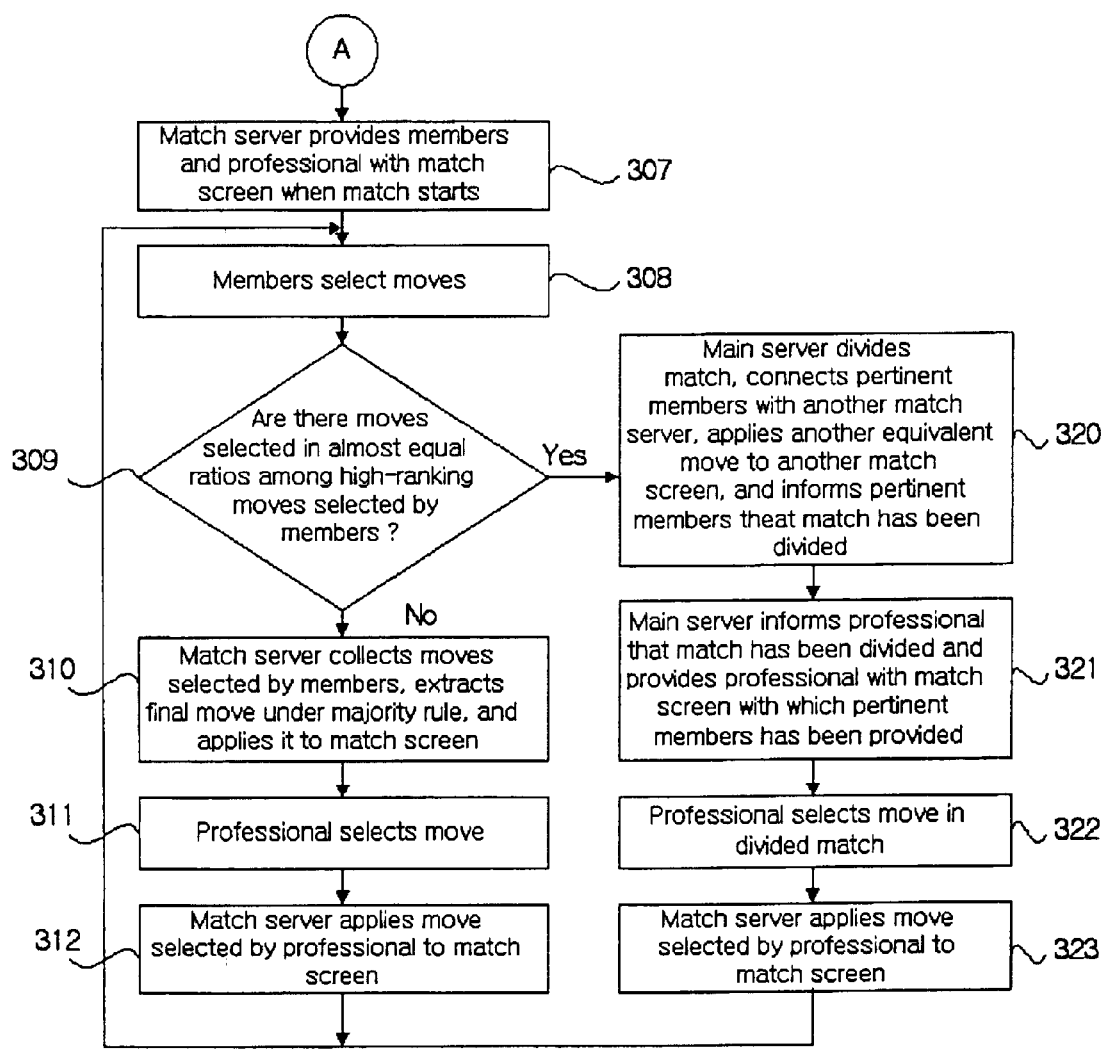

FIGS. 3*a* and 3*b* show the procedure of a one-to-many manner match according to the present invention.

First, the members connect, via the internet, a PC communication service, etc., with the web site which provides the service according the present invention and login to the web site having gone through a process of authentication (step 301). Then, the web site provides the members with member information including their match records stored in the database 106 and with a list of matches, in which the members can participate, after searching match information stored in the temporary database 105 (step 302). At this time, the list of matches includes information on the professional, the starting time of a match, the number of members currently on standby, etc.

When the members select a match in which they want to participate, from the list (step 303), the main server connects the members with the match server which progresses the selected match (step 304), the members are then on standby until the match starts (steps 305 and 306). At this time, the professional having already logged in to the web site is on standby.

When the match starts, the match server informs the members and the professional of the start and simultaneously provides them with a match screen (step 308).

At this time, the program portion 101 performs data processing for providing the match screen, selection of a move, and division of the match. In addition, the members, who are usually less competent than the professional, first move the stones according to a general match rule. Each of the members selects a move by clicking a mouse button after moving a mouse cursor to the desired position on the match screen (step 308). A time limit for each move would ensure smooth progress of the match. When the members have completed selecting their moves, the program portion 101 collects this data provided from member clients and extracts a move having the greatest majority. It is confirmed as to whether there are moves which are selected in almost equal ratios by the members among high-ranking moves (step 309).

If the difference between the number of members who select the highest-ranking move and the number of members who select the other moves is larger than a predetermined reference value, the match server reflects the highest-ranking moves on the match. A few members who do not select the highest-ranking move should forcibly accept the move (step 310). Thereafter, when the professional selects a move, the match server reflects the move selected by the professional and waits for the members to select the next move. Thus, the match proceeds by repeating steps 308 to 312.

Furthermore, at step 309, if the difference between the number of members who select the highest-ranking move and the number of members who select a second highest-ranking move is less than a predetermined reference value, i.e., the two numbers are almost equal with each other, the main server divides the members, who select the second highest-ranking move, from the match server (first match server) and connects them with another match server (second match server). At this time, the main server divides the parent match and simultaneously connects the match server (second match server) for progressing the divided match with the professional. Then, the main server also informs the divided members and the professional that the match has been divided (step 320). Therefore, the divided members are provided with a divided match screen on which the move selected by themselves is reflected, and the professional is simultaneously provided with both the original match screen and the divided match screen to play two matches with two groups of members (step 321). Consequently, when the professional is involved in a plurality of matches, it is not necessary for the professional to play matches in order of division, but the proceeding order of matches may be changed at any time in accordance with the professional's selection. When the professional selects a move in the divided match (step 322), the pertinent match server reflects the move selected by the professional on the divided match screen (step 323) and waits for the divided members to select the next move. Thus, the divided match also proceeds by repeating steps 308 to 312.

If the determination at step 309 is positive in the process of steps 308 to 312, the match may be continuously divided. Thus, the previously divided match may also be divided into further matches.

Figure 4:
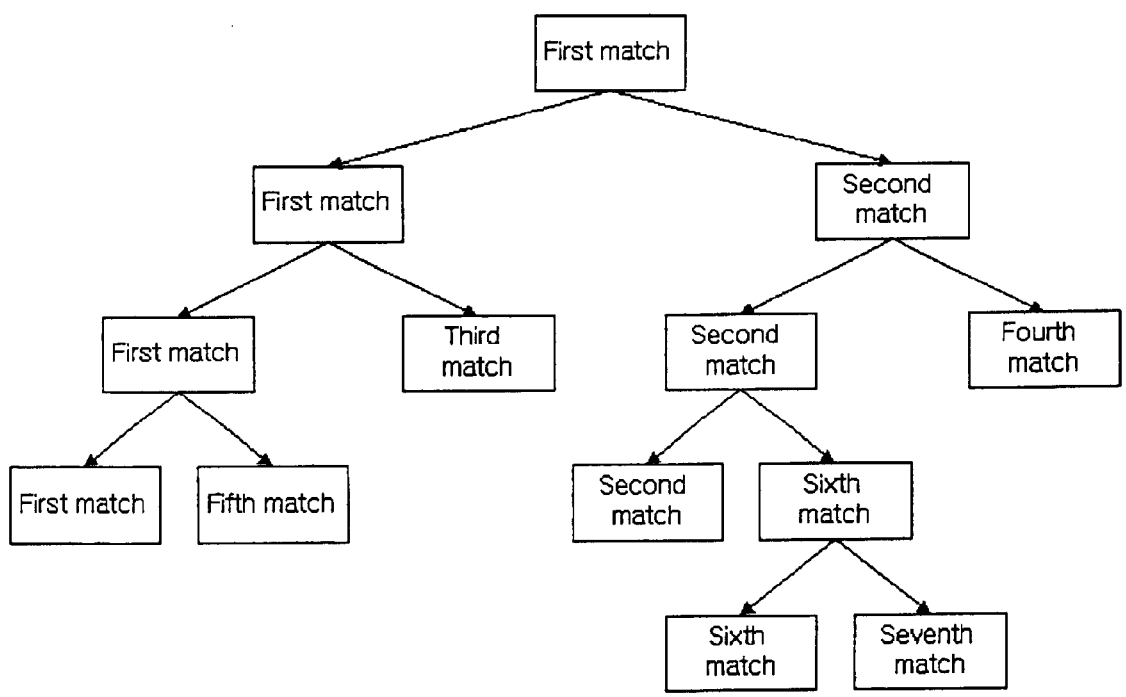
FIG. 4 is a tree diagram showing an example of division of matches according to the present invention.

FIG. 4 is a tree diagram showing an example of division of matches according to the present invention.

Assuming that an original match is the first match, a match divided from the first match at step 309 is a second match as a match subordinate to the first match. At this time, the first match is still maintained and may be continuously divided during the progression of the match so that third and fifth matches subordinate thereto may be generated. Furthermore, the second match may be divided and form fourth and sixth matches subordinate to the second match. In addition, the sixth match subordinate to the second match may generate a seventh match subordinate thereto.

Therefore, respective subordinate matches generated by the division of match as well as the first match may generate further subordinate matches during the progression of the match, if the criteria is satisfied at step 309.

The present invention as described above is not limited to the one-to-many match but may also be applied to a group-to-group match with a specific person such as the professional excluded. Furthermore, the type of game to which the present invention may be applied includes card games or Korean card games using cards as well as a game using standing pieces, such as paduk, Korean chess, chess, etc. In the case of card games, with the application of the concept of the move to the cards, the members select the cards to be pulled out among the cards in their hands during the card game and the final card to be pulled out is selected under majority rule by employing the selection method of the move in the match server as described above.

INDUSTRIAL APPLICABILITY

As described with reference to the embodiment, the present invention provides the service in which a specific person can play simultaneous matches with many persons. Thus, a plurality of novice players can have a match with a high-ranking professional, thereby improving his or her competence by referring to moves selected by a majority of persons. The professional can obtain a regular income through a contract for participation in a match during a specified period of time.

Further, since a separate match server is provided whenever a match is divided into matches, the main server of the web site can be prevented from being over loaded.

What is claimed is:

1. In an on-line game providing a plurality of matches, each of said plurality of matches being played in a manner of using a plurality of stones, a game method for allowing to play the game simultaneously between a professional and a plurality of members, said game method comprising:

connecting said members to a match server;

providing a match screen to each of said members and said professional connected to said match server, respectively;

extracting a highest-ranking move which greatest majority of said members select, when each member selects a stone's move of said plurality of stones;

applying said highest-ranking move to said match screen of each of said members and said professional, respectively; and applying said move selected by said professional to said match screen of each of said members and said professional, respectively, when said professional selects a stone's move of said plurality of stones.

2. The game method as claimed in claim 1, further comprising:

searching moves which are selected by said members in a ratio almost equal to that of said highest-ranking move; and if there is a second highest-ranking move selected in a ratio almost equal to that of said highest-ranking move, connecting members who select said second highest-raking move and said professional with another match server and informing said members and said professional connected with said another match server that said match has been divided.

3. The game method as claimed in claim 2, wherein said members are connected to said match server with which said members themselves are affiliated, and said professional is connected simultaneously to said respective match servers.

4. The game method as claimed in claim 1, wherein said step of applying said highest-ranking move to said match screen of said members and said professional further comprises applying said highest-ranking move to a few members who select minor moves.

* * * * *